United States Patent
Jackson

(10) Patent No.: US 8,883,064 B2
(45) Date of Patent: Nov. 11, 2014

(54) METHOD OF MAKING PRINTED FASTENER

(75) Inventor: Nicholas Jackson, Davisburg, MI (US)

(73) Assignee: A. Raymond & Cie, Grenoble (FR)

( * ) Notice: Subject to any disclaimer, the term of this patent is extended or adjusted under 35 U.S.C. 154(b) by 426 days.

(21) Appl. No.: 13/151,374

(22) Filed: Jun. 2, 2011

(65) Prior Publication Data

US 2012/0308332 A1 Dec. 6, 2012

(51) Int. Cl.
  B29C 35/08 (2006.01)
  B29C 41/02 (2006.01)
  B29C 67/00 (2006.01)
  F16B 21/08 (2006.01)

(52) U.S. Cl.
  CPC ......... *B29C 67/0051* (2013.01); *B29C 67/0055* (2013.01); *B29C 67/0059* (2013.01); *B29C 67/0062* (2013.01); *F16B 21/084* (2013.01)
  USPC ........ 264/401; 264/297.8; 264/460; 264/463; 264/494

(58) Field of Classification Search
  USPC ............... 264/297.8, 401, 460, 463, 482, 497
  See application file for complete search history.

(56) References Cited

U.S. PATENT DOCUMENTS

| | | | |
|---|---|---|---|
| 3,466,966 A | 9/1969 | Brown | |
| 4,296,949 A | 10/1981 | Muetterties et al. | |
| 4,334,814 A | 6/1982 | McKewan | |
| 4,403,895 A * | 9/1983 | Caldwell et al. | 411/378 |
| 4,575,330 A | 3/1986 | Hull | |
| 4,900,210 A | 2/1990 | Buchanan et al. | |
| 5,143,817 A | 9/1992 | Lawton et al. | |
| 5,168,604 A | 12/1992 | Boville | |
| 5,273,383 A | 12/1993 | Hughes | |
| 5,306,098 A | 4/1994 | Lewis | |
| 5,316,245 A | 5/1994 | Ruckwardt | |
| 5,324,151 A | 6/1994 | Szudarek et al. | |
| 5,328,752 A | 7/1994 | Miyazato | |
| 5,337,983 A | 8/1994 | Mailey | |
| 5,401,905 A | 3/1995 | Lesser et al. | |
| 5,468,108 A * | 11/1995 | Sullivan et al. | 411/510 |
| 5,503,785 A | 4/1996 | Crump et al. | |
| 5,505,411 A | 4/1996 | Heaton et al. | |
| 5,599,149 A * | 2/1997 | Clemente | 411/386 |
| 5,617,911 A | 4/1997 | Sterett et al. | |
| 5,647,931 A | 7/1997 | Retallick et al. | |
| 5,658,412 A | 8/1997 | Retallick et al. | |
| 5,829,937 A | 11/1998 | Morello et al. | |

(Continued)

FOREIGN PATENT DOCUMENTS

| | | |
|---|---|---|
| DE | 102006062373 A1 | 6/2008 |
| EP | 0490546 A1 | 6/1992 |

(Continued)

OTHER PUBLICATIONS

Evans, C.; "What is Rapid Prototyping?"; XP002681573; http://www.articlesbase.com/industrial-articles/what-is-rapid-prototyping-3699771.html; Nov. 11, 2010; 1 page.

(Continued)

*Primary Examiner* — Leo B Tentoni

(57) ABSTRACT

A spiral fastener is provided. In another aspect, a spiral fastener, is made of layers of material and/or a light curable material. Another aspect uses a three-dimensional printing machine to emit material from an ink jet printing head to build up a fastener having a spiral formation.

31 Claims, 5 Drawing Sheets

(56) References Cited

U.S. PATENT DOCUMENTS

| | | | |
|---|---|---|---|
| 5,837,172 A | 11/1998 | Pritchard et al. | |
| 5,866,058 A | 2/1999 | Batchelder et al. | |
| 5,906,465 A | 5/1999 | Sato et al. | |
| 5,921,510 A | 7/1999 | Benoit et al. | |
| 5,971,688 A * | 10/1999 | Anstett | 411/456 |
| 5,980,230 A | 11/1999 | Dowd et al. | |
| 6,116,832 A | 9/2000 | Wolf et al. | |
| 6,259,962 B1 | 7/2001 | Gothait | |
| 6,336,779 B1 | 1/2002 | Jakob et al. | |
| 6,338,602 B1 | 1/2002 | Gombert | |
| 6,467,650 B1 | 10/2002 | Lesser et al. | |
| 6,536,807 B1 | 3/2003 | Raymond et al. | |
| 6,569,373 B2 | 5/2003 | Napadensky | |
| 6,644,763 B1 | 11/2003 | Gothait | |
| 6,658,314 B1 | 12/2003 | Gothait | |
| 6,669,150 B2 | 12/2003 | Benoit et al. | |
| 6,850,334 B1 | 2/2005 | Gothait | |
| 6,896,839 B2 | 5/2005 | Kubo et al. | |
| 7,073,230 B2 | 7/2006 | Boville | |
| 7,125,512 B2 | 10/2006 | Crump et al. | |
| 7,172,161 B2 | 2/2007 | Rosemann et al. | |
| 7,183,335 B2 | 2/2007 | Napadensky | |
| 7,220,380 B2 | 5/2007 | Farr et al. | |
| 7,225,045 B2 | 5/2007 | Gothait et al. | |
| 7,255,821 B2 | 8/2007 | Priedeman, Jr. et al. | |
| 7,300,619 B2 | 11/2007 | Napadensky et al. | |
| 7,341,282 B2 | 3/2008 | Moretti et al. | |
| 7,364,686 B2 | 4/2008 | Kritchman et al. | |
| 7,369,915 B2 | 5/2008 | Kritchman et al. | |
| 7,479,510 B2 | 1/2009 | Napadensky et al. | |
| 7,500,846 B2 | 3/2009 | Eshed et al. | |
| 7,503,528 B2 | 3/2009 | Adams et al. | |
| 7,506,897 B2 | 3/2009 | Bauer | |
| 7,537,247 B2 | 5/2009 | Trede et al. | |
| 7,593,214 B2 | 9/2009 | Lee | |
| 7,604,768 B2 | 10/2009 | Kritchman | |
| 7,614,590 B2 | 11/2009 | Boville | |
| 7,628,857 B2 | 12/2009 | Kritchman et al. | |
| 7,658,976 B2 | 2/2010 | Kritchman | |
| 7,685,694 B2 | 3/2010 | Zagagi et al. | |
| 7,686,605 B2 | 3/2010 | Perret et al. | |
| 7,713,048 B2 | 5/2010 | Perret et al. | |
| 7,725,209 B2 | 5/2010 | Menchik et al. | |
| 7,736,578 B2 | 6/2010 | Ederer | |
| 7,740,683 B2 | 6/2010 | Thorsson et al. | |
| 7,747,341 B2 | 6/2010 | Dubois et al. | |
| 7,753,320 B2 | 7/2010 | Geiger et al. | |
| 7,767,130 B2 | 8/2010 | Elsner et al. | |
| 7,770,938 B2 | 8/2010 | Bauer | |
| 7,829,000 B2 | 11/2010 | Farr et al. | |
| 7,837,248 B2 | 11/2010 | Nedelman | |
| 7,851,122 B2 | 12/2010 | Napadensky | |
| 7,887,012 B2 | 2/2011 | Desai et al. | |
| 7,891,095 B2 | 2/2011 | Jonsson et al. | |
| 2002/0171177 A1 | 11/2002 | Kritchman et al. | |
| 2003/0151167 A1 | 8/2003 | Kritchman et al. | |
| 2003/0180117 A1* | 9/2003 | Niku | 411/392 |
| 2004/0067122 A1* | 4/2004 | Post | 411/383 |
| 2005/0072113 A1 | 4/2005 | Collins et al. | |
| 2005/0098688 A1 | 5/2005 | Miarka et al. | |
| 2006/0176350 A1 | 8/2006 | Howarth et al. | |
| 2008/0211132 A1 | 9/2008 | Feenstra | |
| 2008/0237933 A1 | 10/2008 | Hochsmann et al. | |
| 2008/0282527 A1 | 11/2008 | Beck et al. | |
| 2009/0017219 A1 | 1/2009 | Paasche et al. | |
| 2009/0045553 A1 | 2/2009 | Weidinger et al. | |
| 2009/0142619 A1 | 6/2009 | Miyoshi | |
| 2009/0304952 A1 | 12/2009 | Kritchman | |
| 2010/0217429 A1 | 8/2010 | Kritchman et al. | |
| 2010/0270713 A1 | 10/2010 | Frangov et al. | |
| 2010/0294549 A1 | 11/2010 | Laville et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2012/0033002 A1 | 2/2012 | Seeler et al. | |

FOREIGN PATENT DOCUMENTS

| | | |
|---|---|---|
| EP | 2156942 A1 | 2/2010 |
| FR | 2935031 A1 | 2/2010 |
| GB | 1208543 A | 10/1970 |
| GB | 1440062 A | 6/1976 |
| WO | WO-2007016469 A2 | 2/2007 |
| WO | WO-2011053170 A1 | 5/2011 |
| WO | WO-2011135087 A1 | 11/2011 |

OTHER PUBLICATIONS

Colton, Prof. J.S., "Bolt Manufacture: Process Selection", XP002681623, Georgia Institute of Technology, URL: www-old.me.gatech.edu/jonathan.colton/me4210/procselect1.pdf, 1999, pp. 1-37.

"TIXOS—Implants Line Manufactured by Titanium Powder Laser Microfusion", XP002681624, Smile Dental Journal, vol. 5, No. 3, Sep. 1, 2010, p. 56.

"3D printing The printed world", XP-002683243, http://www.economist.com/node/18114221/print, Feb. 10, 2011, 9 pages.

"Make Your Ideas Real—Give Your Creativity a New Dimension, dimension 3D Printers," Stratasys; company brochure; (2010) 73 pages, Stratasys Document #204400-0002.

Brain, Marshall. "How Stereolithography 3-D Layering Works," HowStuffWorks.com.; http://www.howstuffworks.com/stereolith.htm; article, Oct. 5, 2000, 6 pages.

"Stereolithography," Wikipedia, http://en.wikipedia.org/wiki/Stereolithography; article, last modified Jun. 1, 2011, 5 pages.

"3D Printing," Wikipedia, http://en/wikipedia.org/wiki/3D_printing; article, last modified Jun. 20, 2011, 5 pages.

"Connex500, The First Multi-Material 3-Dimensional Printing System", Objet Geometries Ltd.; article, (2010), 2 pages.

"PolyJet Matrix™ Technology," Objet Geometries Ltd.; brochure, (2009), 6 pages.

"Automotive," Objet Geometries, Inc.; article, http://www.objet.com/INDUSTRIES/Automotive; Sep. 12, 2010, 1 page.

"Keeping AP Racing on Track," Objet Geometries Ltd.; printout, www.2objet.com, (2007), 2 pages.

"The Power of Two, Case Study," Objet Geometries Ltd.; printout, www.objet.com, (2010), 2 pages.

"A Factory on Your Desk,"; The Economist Technology Quarterly; article, Sep. 5, 2009, pp. 26-29.

Rao. M.; Webcourse publication IIT-Delhi/Computer Aided Design & Manufacturing II—Module G(4): Rapid Prototyping (Apr. 18, 2011).

"Consumer Goods", Case Study, Objet Geometries Ltd., printout, May 5, 2011, http://objet.com/INDUSTRIES/consumer_Goods/.

"EOS in brief; e-Manufacturing Solutions", EOS Worldwide, brochure (2010).

Direct metal taster sintering, Wikipedia, http://en.wikipedia.org/wiki/Direct_metal_laser_sintering, article, last modified Mar. 23, 2011, 3 pages.

Sprovieri, John, "Fastening: Christmas Trees Ain't Just for December.", Assembly Magazine, downloaded from Internet on Aug. 5, 2011, http://www.assemblymag.com/Articles/Article_Rotation/BNP_GUID_9-5-2006_A_100000.

EOSINT S 750 product brochure, "Double laser-sintering system for the direct, tool-less production of sand cores and moulds for metal castings" downloaded from internet Apr. 1, 2011, http://img.directindustry.com/pdf/repository_di/5078/eosint-s-750-21926_1b.jpg.

EOS e-Manufacturing Solutions, brochure, EOS GmbH Electro Optical Systems, downloaded from internet Apr. 1, 2011, www.eos.info.

"Laser sintering—versatile production of tooling inserts, prototype parts and end products from metal powder", International Powder Metallurgy Directory, http://www.ipmd.net/articles/articles/001087.html, downloaded Apr. 1, 2011.

EOSINT M 280: "Laser-sintering system for the production of tooling inserts, prototype parts and end products directly in metal." Product brochure, EOS e-Manufacturing Solutions, downloaded from internet Apr. 1, 2011, http://www.eosinfo/en/products/systems-equipment/metal-laser-sintering-systems.html.

(56) References Cited

OTHER PUBLICATIONS

"Digitalized e-Manufacturing workflows: Direct Metall Laser-Sintering technology enables high quality parts, cost efficiency and time savings", press release Mar. 22, 2011, EOS Electro Optical Systems Gmbh, downloaded from internet Apr. 1, 2011, http://www.eos.info/en/news-events/press-relesases/pressdetails/article/103/digitalisier.html.

"Objet. The Power to Create. Jaguar Land Rover", 3Dprinting & Rapid Prototyping by Objet Geometries Ltd.; printout, <http://www.objet.com>/, May 31, 2011.

"Installation Instructions for Towel Bar", Danze (sold in U.S. prior to Jun. 2011).

"Hillman Fasteners 10 Pack #8 Zinc EZ Anchor 41408", downloaded from internet May 19, 2011: <http://www.thegreathardwarestore.com/Hillman-Fasteners-10-Pack-8-Zinc-EZ-Anchor-41408-p/848187.htm>.

"Hillman Fasteners 20 Pack #6 Plas EZ Anchor 41410", downloaded from internet May 19, 2011: <http://www.thegreathardwarestore.com/Hillman-Fasteners-20-Pack-6-Plas-EZ-Anchor-41410-p/848173.htm>.

EOS M 270 3TRPD Shown in Real Time—Machine and Scintering Pattern (published Apr. 1, 2011); pictures; 2 pages.

M. Bonomo, Diamond Fasteners, Diamond Fasteners Blog; "Can 3-D Printing Be Used for NAS Screws?;" http://www.diamondfasteners.com/blog/bid/326572/Can-3-D-Printing-Be-Used-for-NAS . . . (published Nov. 27, 2013); 2 pages.

Internet Catalog Class Listing for Class Threaded Fastener Selection 215; "What is the definition of carriage bolt?;" Tooling University-SME; (published 2013); 4 pages.

Leno, Jay; "Jay Leno's 3D Printer Replaces Rusty Old Parts," Popular Mechanics, http://www.popularmechanics.com/cars/jay-leno/technology/4320759, Jun. 8, 2009, 3 pages.

\* cited by examiner

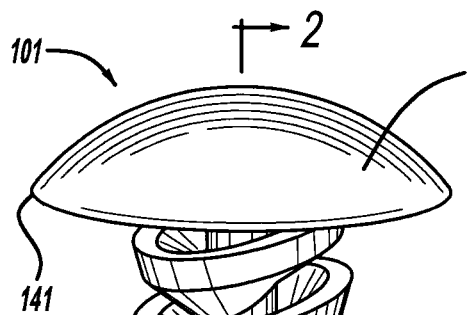
FIG - 1
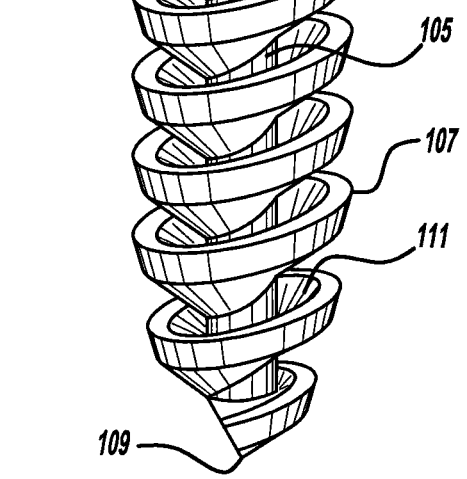
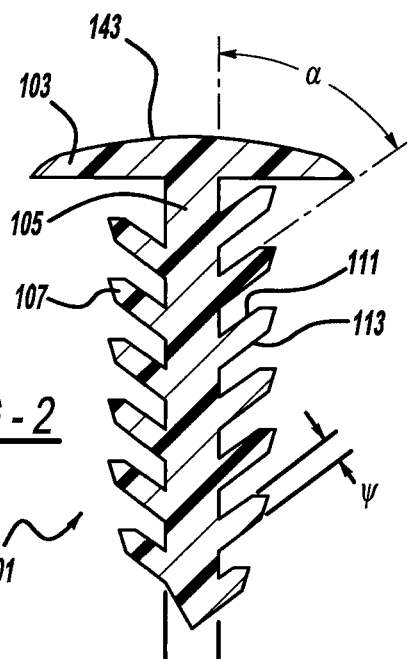
FIG - 2
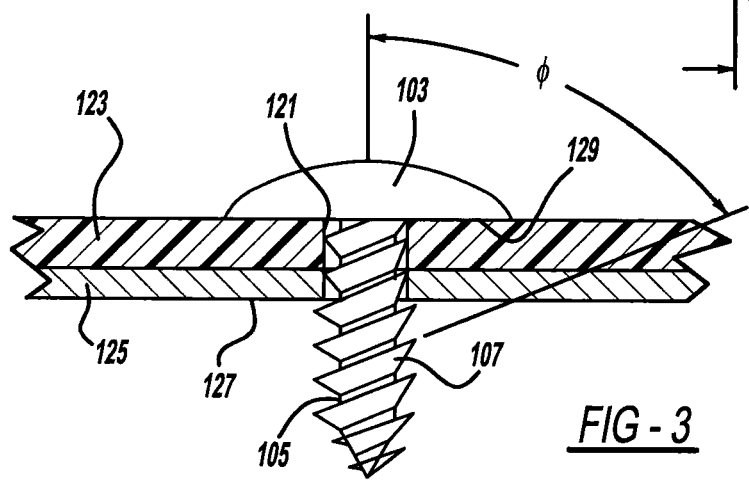
FIG - 3

METHOD OF MAKING PRINTED FASTENER

BACKGROUND AND SUMMARY

The present invention relates generally to fasteners and more particularly to manufacturing of a polymeric fastener having a spiral formation.

Traditionally, polymeric parts are made by injection or extrusion molding. In such processes, a heated polymeric liquid is inserted into match metal dies under high pressure, after which the dies are internally cooled in order to cure the manufactured parts. Air is vented from the die cavity when the molten polymer is injected therein. Injection and extrusion molding are ideally suited for high volume production where one hundred thousand or more parts per year are required. These traditional manufacturing processes, however, disadvantageously require very expensive machined steel dies, which are difficult and time consuming to modify if part revisions are desired, and are subject to problematic part-to-part tolerance variations. Such variations are due to molding shrinkage during curing, molding pressure differences, part warpage due to internal voids and external sink marks, and the like. The expense of this traditional die tooling makes lower volume production of polymeric parts prohibitively expensive.

Exemplary injection molded clips are disclosed in U.S. Pat. No. 5,829,937 entitled "Tolerance Clip" which issued to Morello et al. on Nov. 3, 1998, and U.S. Pat. No. 5,505,411 entitled "Harness Fixing Device" which issued to Heaton et al. on Apr. 9, 1996; both of which are incorporated by reference herein. These clips are of a Christmas tree variety having spaced apart and separated barbs extending from each side of a stem. These clips, however, only provide limited and finite workpiece fastening positions due to the barb spacing. Therefore, this prevents a tightly fastened joint. Furthermore, U.S. Pat. No. 6,336,779 entitled "Fastening System," which issued to Jakob et al. on Jan. 8, 2002, discloses a plastic screw; this screw, however, disadvantageously is only suited for rotational engagement of its thread with a workpiece panel.

It is also known to use stereolithography to produce non-functional polymeric parts other than fasteners. Such conventional stereolithography methods use a laser to create a layered part on a moving platform within a vat of liquid polymer. The part rises from the liquid as it is being made. These parts are extremely slow to produce and impractically brittle.

In accordance with the present invention, a fastener is provided. In another aspect, a spiral fastener, is made of layers of material and/or a light curable material. Another aspect uses a three-dimensional printing machine to emit material from an ink jet printing head to build up a fastener having a spiral formation. A further aspect provides a method of making a spiral fastener by depositing material in layers and/or a built-up arrangement. Yet another aspect makes a spiral fastener by depositing material in an environment where the fastener is essentially surrounded by a gas, such as air, during the material deposition. In another aspect, a linearly insertable, polymeric fastener includes a flexible spiral formation having a continuous undercut or groove between the thread and a central shaft. A method of making a fastener with a spiral formation is also employed in another aspect.

The present spiral fastener and method are advantageous over traditional devices. For example, when three-dimensionally printed, the present spiral fastener and method do not require any unique tooling or dies, thereby saving hundreds of thousands of dollars and many weeks of die manufacturing time. Furthermore, the present three-dimensional printing method allows for quick and inexpensive design and part revisions from one manufacturing cycle to another. In another aspect, part-to-part tolerance variations are essentially non-existent with the presently printed spiral fastener and method such that at least ten, and more preferably at least forty, identical spiral fasteners can be produced in a single machine manufacturing cycle. For other aspects of the presently printed spiral fastener and method, multiple head openings, a stationary support for the built-up fasteners within the machine, and the ambient air manufacturing environment allow for increased manufacturing speed, simpler machinery and ease of access to the manufactured fasteners. It is greatly advantageous that the present polymeric fastener includes a continuously spiraling and tapering workpiece-engagement formation extends around a stem, which provides essentially infinite positioning relative to an attached workpiece of varying thicknesses and hardnesses. For example, the same fastener has a flexible spiral engagement formation or fin which can accommodate a metal panel having a 2 mm thickness and a plaster board panel having a 4 mm thickness. It is also beneficial that the present polymeric spiral fastener is linearly inserted into a workpiece rather than the more time consuming rotation of conventional screws. Additional advantages or features of the present invention can be found in the following description and appended claims as well as in the accompanying drawings.

BRIEF DESCRIPTION OF THE DRAWINGS

FIG. 1 is a perspective view showing a preferred embodiment of a spiral fastener of the present invention;

FIG. 2 is a longitudinal section, taken along line 2-2 of FIG. 1, showing the spiral fastener;

FIG. 3 is a partially fragmented, side elevational view showing the spiral fastener installed in workpieces;

FIG. 7 is a perspective view showing an alternate tool for making the spiral fasteners.

DETAILED DESCRIPTION

Figure 4:
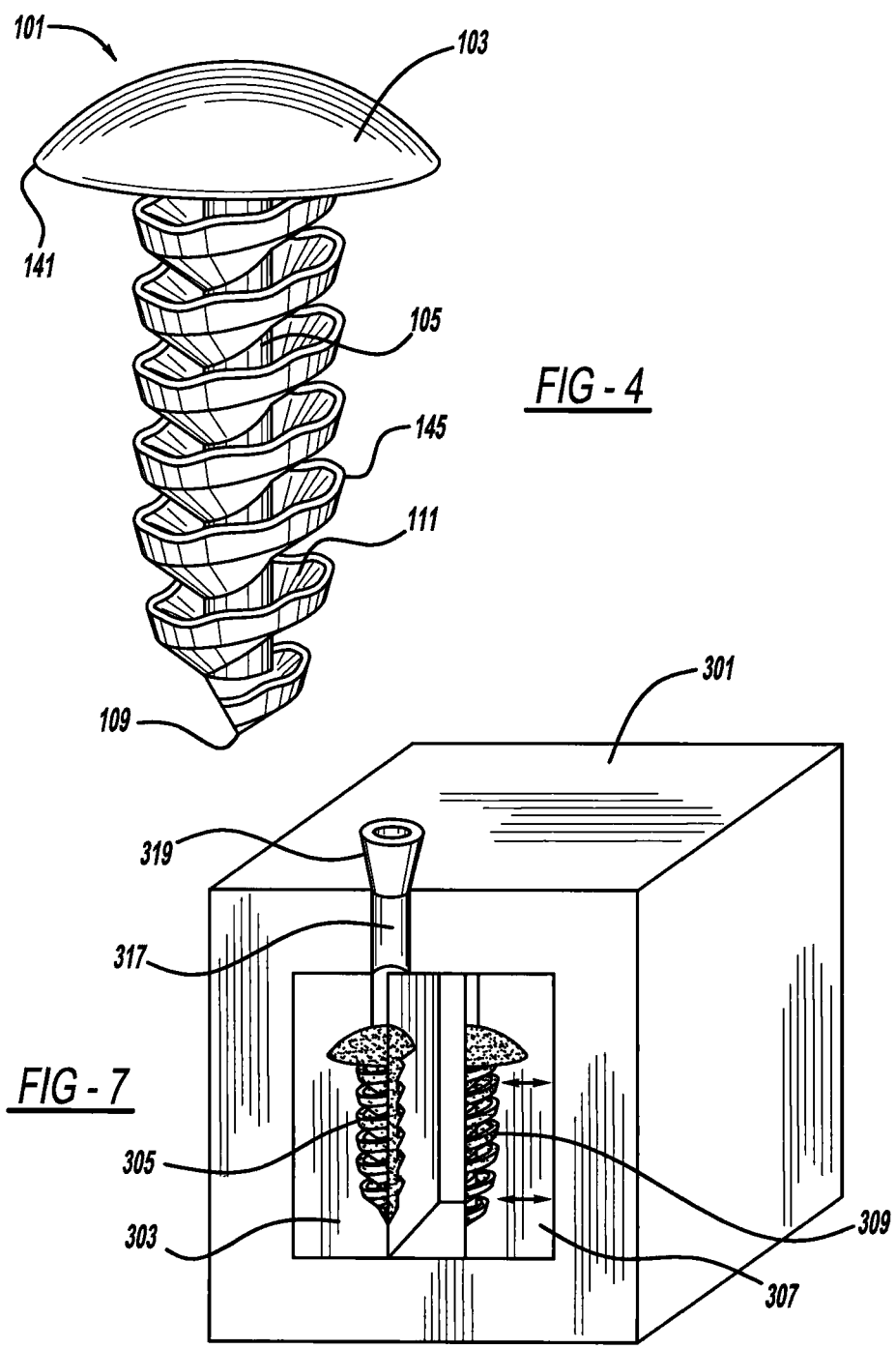
FIG. 4 is a perspective view showing an alternate embodiment of the spiral fastener.

The preferred embodiment of a fastener 101 of the present invention is shown in FIGS. 1-3. Fastener 101 includes a laterally enlarged head 103, a longitudinally elongated shaft or stem 105 extending generally perpendicularly from head 103, and a spiral formation or fin 107 surrounding at least a majority of stem 105. This spiral fastener is ideally suited for fastening a component, such as an interior trim panel, to an automotive vehicle panel. For example, the fastener secures a polymeric or fiberboard door trim panel to a sheet metal door panel. Additionally, the fastener can attach a bracket to a plaster board wall in a building, polymeric partitions within a toy, or the like.

Stem 105 and spiral formation 107 end at a generally pointed end 109 opposite head 103. Furthermore, stem 105 has a greater cross-sectional thickness $\beta$ as compared to a wall thickness $\psi$ of spiral formation 107. An inner surface 111 of spiral formation 107 is tapered continuously along its length so as to define an acute angle $\alpha$ between it and the adjacent facing surface of stem 105 creating an undercut or cup-like groove therebetween. An outer surface 113 of spiral formation 107 also has a generally parallel taper to that of inner surface 111. A side view angle φ between a flat upper edge of spiral formation 107 and a centerline of stem 105 is between thirty and ninety degrees, and more preferably between sixty and seventy degrees, thereby providing a fin peeling pressure on a back side 127 of workpiece 125 to cause tight engagement. Thus, spiral formation 107 creates a spiralling, cup-like and continuous barb structure that can be inwardly flexed toward a longitudinal centerline of stem 105 during insertion into a hole 121 of workpieces 123 and 125. Spiral formation 107, however, outwardly expands back to its nominal condition (as shown in FIG. 2) on back side 127 of workpiece 125 thereby deterring easy removal therefrom since an extraction force is at least twice that of an insertion force. For example, an insertion force of about eight to twelve pounds, and more preferably about ten pounds, is linearly applied to head 103 for the fastener to be fully inserted in a sheet metal workpiece 125; an extraction force of about twenty-five to fifty pounds, and more preferably about forty-five pounds, is linearly applied to pull the fastener out of the workpiece.

The continuous nature of spiral formation 107 provides an infinite adjustment and engagement capability between it and back side 127 of workpiece 125. This allows for tolerance variations of workpieces while providing a very tight and secure fit between the portion of spiral formation 107 immediately engaging back side 127 and a bottom surface 129 of head 103. The taper improves flexibility of the spiral formation thereby further enhancing the fastening tightness and adjustability. This should be contrasted to the spaced apart barbs of conventional Christmas tree fasteners which do not provide infinite adjustability and therefore allow some looseness in many fastening conditions.

Bottom surface 129 of head 103 is generally flat in the preferred embodiment, however, the three-dimensional printing process applied herewith advantageously allows for a flexible umbrella, localized ribs, internal and totally enclosed spaces of predetermined shapes and locations, or the like. With the exemplary fastener disclosed herein, a die-lock condition exists between spiral formation 107 and bottom surface 129 of head 103 that would be difficult and expensive to manufacture with conventional injection molding processes, but such is easily created with the presently preferred three-dimensional ink jet printing process since custom or specialized tooling and dies are not required. Head 103 additionally has a circular periphery 141, and a curved and dome-like top 143. Moreover, stem 105 has a generally cylindrical outside shape between the attached spiral formation intersections. It also worth noting that sharply angled intersections are provided between spiral formation 107 and stem 105 to provide enhanced flexure points.

FIG. 4 illustrates an alternate embodiment polymeric and linearly insertable fastener 101. A head 103 and stem 105 are like the preferred embodiment. A spiral formation or fin 145, however, has a continuously undulating or wavey distal edge which engages workpiece panel 125 (see FIG. 3).

Figure 5:
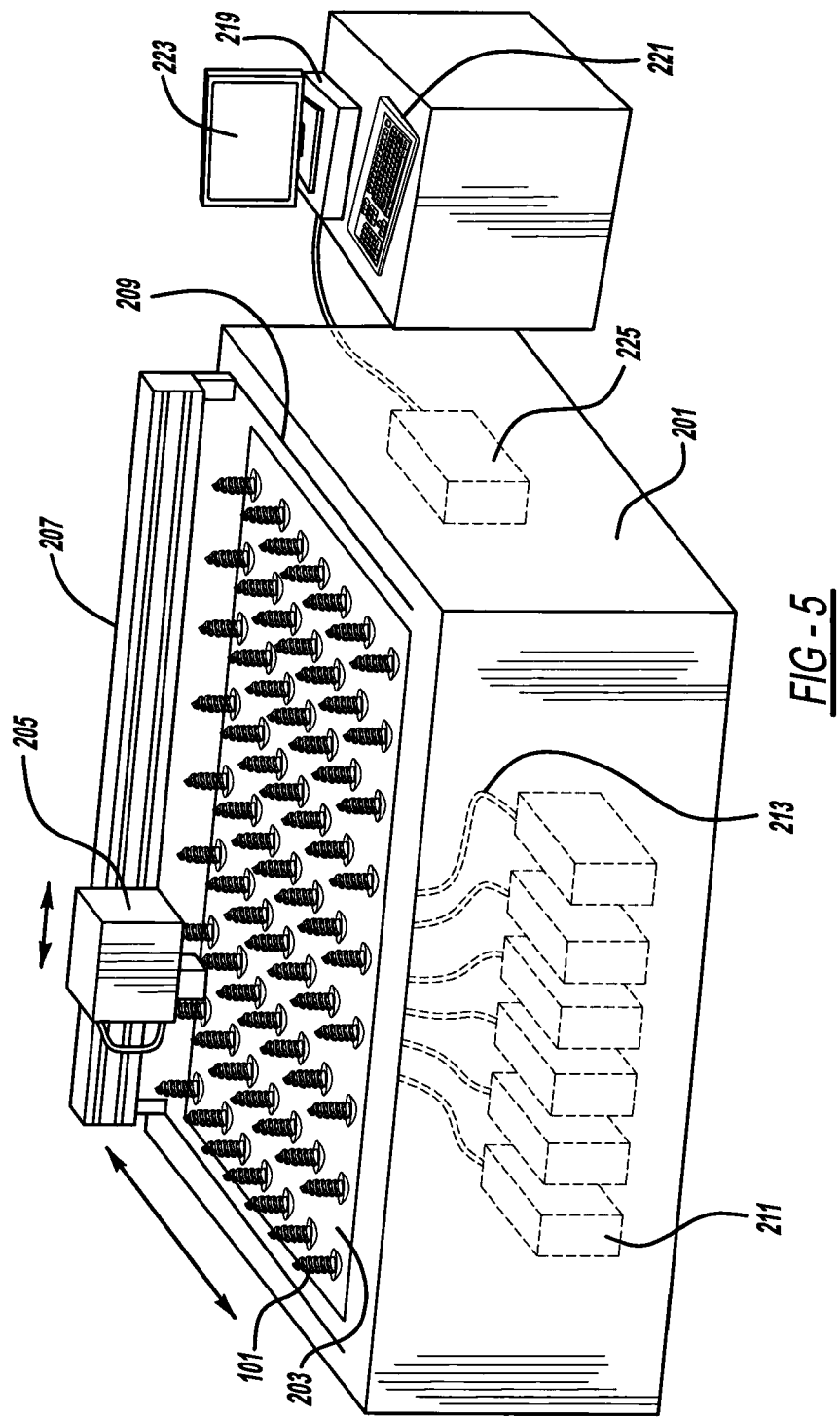
FIG. 5 is a perspective view showing a preferred machine manufacturing the spiral fasteners, with an upper cover of the machine removed.
Figure 6A:
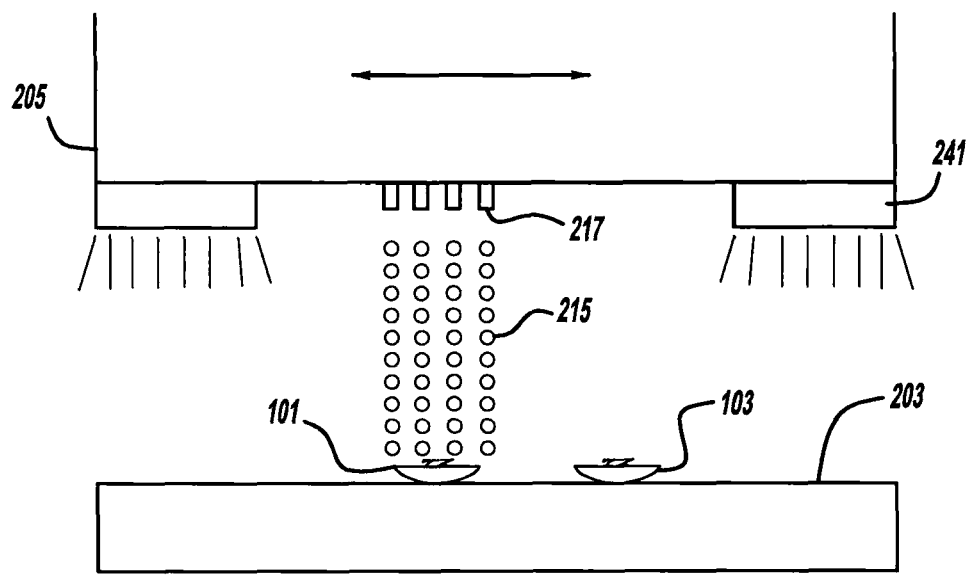
FIGS. 6A-C are a series of diagrammatic side views showing the preferred machine building up the spiral fasteners.
Figure 6B:
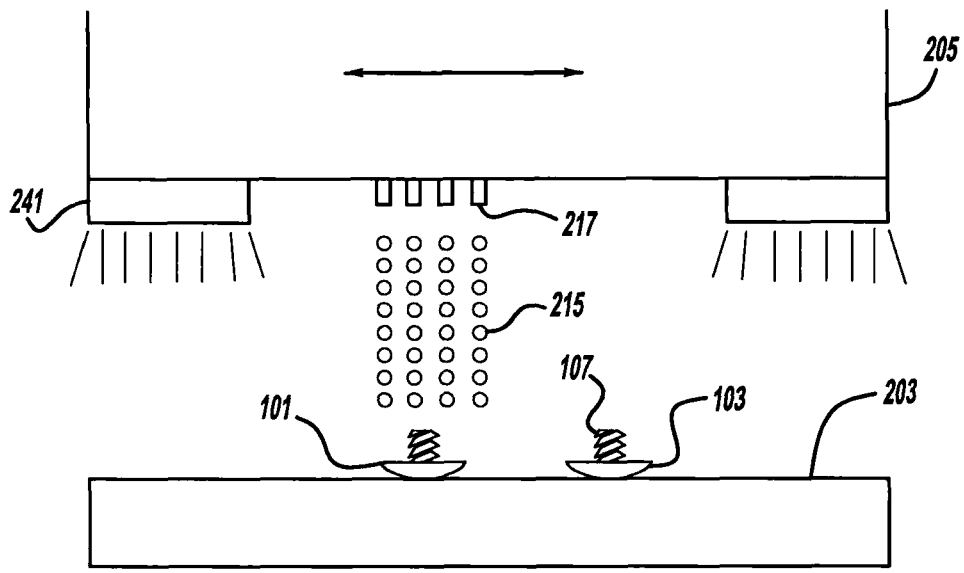
Figure 6C:
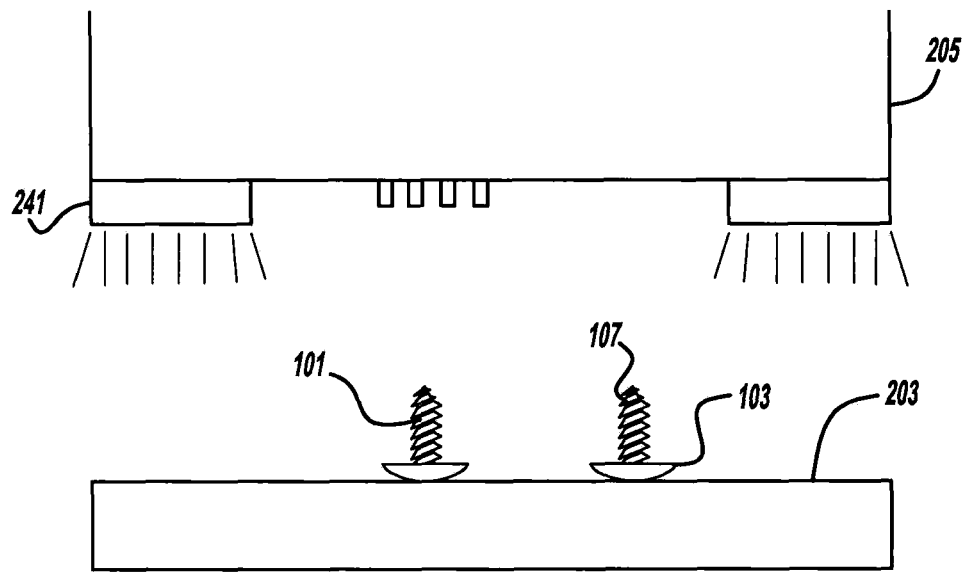

The preferred manufacturing machine and process are shown in FIGS. 5-6C. A three-dimensional printing machine 201 includes a stationary support surface 203 upon which a set of identical fasteners 101 are created. Machine 201 further includes at least one ink jet printer head 205, and preferably eight heads, which traverse side to side along one or more gantry rails 207 by an electric motor or other automatically controlled actuators. The gantry rail also moves fore and aft above support surface 203 along outboard tracks 209, driven by an electric motor or other automatically controlled actuator. At least two storage tanks 211 or removable cartridges are connected to head 205 via supply hoses 213 in order to feed the same or different polymeric materials 215 contained within each tank 211 to multiple ink jet printer openings 217 in head 205. Openings 217 may constitute an array of 10×10 or even 100×100 nozzles, and more preferably 96 nozzles, arranged in a linear array such that multiple material flows are simultaneously emitted during a single head pass. The material is preferably an ultra violet light-curable photopolymer in the form of a powder and water mixture. Alternately, a spool containing an elongated and flexible string or filament of the polymeric material can be fed to the head, melted and emitted onto the support surface as a layered and continuous string.

A computer controller 219, having an input keyboard 221, an output display screen 223, and a microprocessor, is connected to a central processing unit 225 of machine 201 to control the feed of material from tanks 211 and the actuator movement of head 205 relative to support surface 203. The machine user downloads a CAD file containing a design of the fastener into non-transient computer memory, such as RAM, ROM, a hard drive or removeable storage, associated with computer controller 210. The user then uses software instructions stored in the memory to digitally lay out the desired quantity of the fasteners onto support surface 203 and position the fasteners in a manufacturing orientation, while adding any supports to the design which are later removed after the manufacturing. The user also inputs the material(s) to be used in the manufacturing, whereafter the microprocessor in computer controller 219 and CPU 225 runs the software to cause head 205 to begin its movement and material deposition in order to create the set of fasteners.

During the first pass of head 205, ink jet printing openings 217 emit streams of polymeric material 215 and lay down a first layer, constituting an external surface 143 (see FIG. 2) of fastener head 103 with a first transverse pass of machine head 205. This first pass lays down a material thickness of approximately 0.1-1.0 mm of fastener. As the machine head continues in its transverse path, it will also lay down the same exact material layer for each adjacent fastener being manufactured in the same manufacturing cycle. Alternately, if the array of openings is large enough, spread out or contained on multiple heads, then multiple heads can be simultaneously deposited. One or more ultraviolet lights 241 are attached to head 205 which serve to emit light onto the layered material immediately after its deposition which binds together and cures the layer of material deposited. After the first layer has been deposited for each of the multiple fasteners, head 205 then emits a second layer of polymeric material 215 upon the already deposited first layer which is then bound to the first layer when cured by lights 241. This layering and curing is repeated many times, for example, with more than fifty layers or head passes, until the fastener is fully created.

Material is deposited where computer controller 219 informs head that a wall or other polymeric formation is desired but head will not deposit any material where a bore or other open area is present in the CAD drawing of the fastener. An exemplary material is a DM 9870 polymer. The polymeric material is stacked in many layers thereby creating the entire fastener as an integral and single piece part in a gaseous, particularly air, environment inside an enclosure of machine 201. In other words, the fasteners are all surrounded by air except for the first layer which contacts support surface 203, during the entire manufacturing cycle. As used herein, manufacturing or machine "cycle" refers to the time period from which the head begins depositing the first layer of material until when the head deposits the final layer of material for the completed part and is cured in the machine. After the machine cycle is complete, the user manually removes the manufactured fasteners from support surface 203, such as by use of a putty knife or other removal tool. At least forty fasteners are made in a single machine cycle, which is preferably less than ninety minutes. In one optional step, each removed fastener is dipped into a hardener, solvent or final curing solution, which also serves to dissolve any supports, especially when the supports are made of a solvent-dissolvable material, different from the primary material defining walls of the fastener.

Exemplary generic three-dimensional printing machines and materials that can be employed to make spiral fastener 101 as specified herein are disclosed in U.S. Patent Publication Nos. 2010/0217429 entitled "Rapid Production Apparatus" which published to Kritchman et al. on Aug. 26, 2010, 2011/0074065 entitled "Ribbon Liquefier for Use in Extrusion-Based Digital Manufacturing Systems" which published to Batchelder et al. on Mar. 31, 2011, and U.S. Pat. No. 7,851,122 entitled "Compositions and Methods for Use in Three Dimensional Model Printing" which issued to Napadensky on Dec. 14, 2010, U.S. Pat. No. 7,369,915 entitled "Device, System and Method for Accurate Printing of Three Dimensional Objects" which issued to Kritchman et al. on May 6, 2008, and U.S. Pat. No. 5,866,058 entitled "Method for Rapid Prototyping of Solid Models" which issued to Batchelder et al. on Feb. 2, 1999. These patent publications and patents are all incorporated by reference herein. A presently preferred machine is the Connex 500 model from Objet Geometries Inc. but may less preferably be a Dimension Elite fused deposition modeling machine from Stratasys, Inc. Nevertheless, it should be appreciated that manufacturing the spiral fasteners disclosed herein by the present three-dimensional printing steps also disclosed herein is a significant leap in technology.

Figure 8:
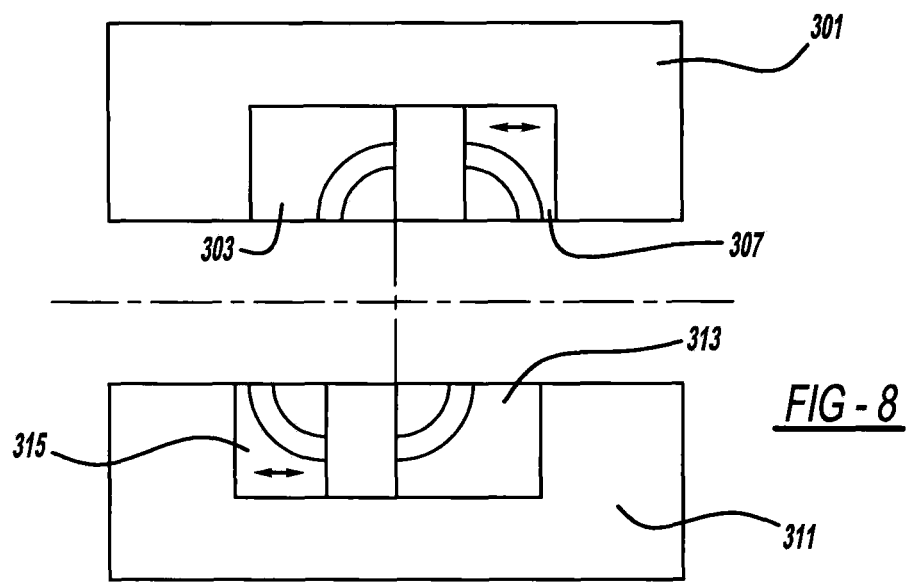
FIG. 8 is a top diagrammatic view showing the alternate tool for making the spiral fasteners.

FIGS. 7 and 8 illustrate an alternate and less desirable embodiment tool 301 used to manufacture spiral fastener 101 (see FIGS. 1 and 2). Tool 301 is a dedicated injection molding die mounted to a fixed platen in a closable press. A similar matching tool 311 is attached to an opposite and movable platen in the press. A fixed or stationary insert 303, having a quarter molding cavity 305 which defines a portion of the head, stem and spiral formation of the spiral fastener, is located within tool 301. A similarly configured quarter molding cavity is disposed in a movable slide 307 coupled inside of tool 301. Slide 307 is automatically moved side-to-side within tool 301 by an actuator, such that it is positioned against insert 303 when a molten polymer is injected by a nozzle 319 of an injection molding machine into a sprue 317 of tool 301. After curing, slide 307 is slid away from insert 303 to allow the cured and hardened fastener 101 to be removed from tool 301, which requires flexure of the spiral formation due to the die-locked nature of fastener groove or undercut. Tool 311 is similarly constructed with a fixed insert 313 and a slide 315. This dedicated injection molding tool is useable for high volume production of the spiral fasteners but is not as beneficial from tooling cost and part-to-part tolerance standpoints as is the preferred three-dimensional printing process.

While various embodiments have been disclosed herein, and it should be appreciated that other variations may be employed. For example, the spiral volute may be spaced away from the head to provide a cylindrically or rectangularly shaped shoulder therebetween. The spiral fastener can alternately be employed for marine, aircraft or other industries, although certain advantages may not be achieved. Additionally, multiple spaced apart heads or heads of different shape can be printed as part of the fastener, however, various benefits may not be realized. Furthermore, the spiral fastener can have a head and/or stem of a rigid three-dimensionally printed polymer and the spiral formation of a different and flexible three-dimensionally printed polymer, integrally additively layered in the same machine head passes. Nevertheless, such changes, modifications or variations are not to be regarded as a departure from the spirit and scope of the invention.

The invention claimed is:

1. A method of making a fastener, the method comprising:
    (a) depositing a layer of polymeric material onto a support surface;
    (b) depositing subsequent layers of the material upon each prior layer until the fastener is completely created;
    (c) creating the fastener to comprise a laterally enlarged head, a longitudinal elongated stem and a spiral formation surrounding at least a majority of the stem, made of the material, as part of the depositing steps;
    (d) surrounding at least a majority of the fastener with a gas during the depositing and creating steps;
    (e) curing the fastener with light so that the layers of the material bond together; and
    (f) removing the completed fastener from the support surface, wherein the completed spiral formation is flexible and includes a tapered inside surface at an acute angle relative to a facing surface of the stem, and a cross-sectional thickness of the spiral formation bounded by the tapered inside surface is less than a cross-sectional thickness of the adjacent stem.

2. The method of claim 1, further comprising creating a tapered distal end on the fastener opposite the head, from the polymeric and light curable material, the head having a circular periphery.

3. The method of claim 1, further comprising creating tapered outside surfaces on the spiral formation such that a die-locked area is formed between the inside surface and a facing surface of the stem adjacent the head, and the inside and outside surfaces define the spiral formation therebetween.

4. The method of claim 1, further comprising creating the spiral formation to allow flexure between it and the stem, and creating the spiral formation to allow for infinite workpiece-to-fastener adjustment along the stem, and the spiral formation having a constant outside diameter for more than 360°.

5. The method of claim 1, wherein the gas is air, and the fastener is an integral single piece.

6. The method of claim 1, further comprising flowing the material from a machine head positioned above the support surface, at least one of the machine head and the support surface automatically moving relative to the other according to computer instructions in order to create identical multiples of the fastener in the same machine cycle, free of contraction or expansion due to the manufacture thereof.

7. The method of claim 1, wherein the material is a three-dimensionally printable polymer supplied to a machine head through a hose.

8. The method of claim 1, wherein at least ten of the fasteners with spiral formations are substantially simultaneously manufactured in a single machine cycle in less than ninety minutes.

9. The method of claim 1, further comprising flowing the material from an ink jet printing head including openings such that multiple material flows are simultaneously occurring for each layer of the fastener.

10. The method of claim 1, further comprising creating a die-lock condition between the spiral formation and the head.

11. A method of using a three-dimensional printing machine, the method comprising:
    (a) emitting polymeric material from an ink jet printing head of the machine;

(b) building up a spiral fastener by placing the polymeric material to define a fastener head;
(c) building up the spiral fastener by placing the polymeric material to define an undercut and tapered spiral thread with a die-locked area being created along at least a majority of the spiral thread; and
(d) curing the fastener with light as the spiral fastener is being built up.

12. The method of claim 11, further comprising building up the spiral fastener by placing the polymeric material to define a stem extending from the fastener head and located within the spiral thread, and the spiral thread being flexible to allow for flexed linear workpiece-insertion thereof.

13. The method of claim 12, further comprising creating a tapered outer and inner surface on the spiral thread such that an acute angle is defined between the inner surface and a facing surface of the stem.

14. The method of claim 11, further comprising creating a point on the fastener opposite the fastener head, from the polymeric and light curable material, and multiple turns of the spiral thread have the same outside diameter.

15. The method of claim 11, further comprising building up the fastener on a layer by layer basis, the machine further comprising a support surface upon which the material is built up, and at least one of the machine head and the support surface moving relative to the other to create each layer with a movement pass.

16. The method of claim 11, further comprising flowing the material from the ink jet printing head through openings such that multiple material flows are simultaneously occurring for each layer of the spiral fastener.

17. A method of making a fastener, the method comprising:
(a) using at least one ink jet printer opening to emit at least one three-dimensionally printable polymer to create a laterally enlarged head having a circular periphery;
(b) using the at least one ink jet printer opening to emit the at least one three-dimensionally printable polymer to create a longitudinally elongated stem extending from the head;
(c) using the at least one ink jet printer opening to emit the at least one three-dimensionally printable polymer to create a continuous and flexible spiral around at least a majority of the stem; and
(d) making at least ten of the fasteners during a printing machine cycle within ninety minutes, without requiring fastener-specific dies.

18. The method of claim 17, wherein the head is built up before the stem.

19. The method of claim 17, further comprising creating a die-locked area between the spiral and the stem.

20. The method of claim 17, wherein the fastener withstands a greater linear extraction force with regard to a mating workpiece as compared to a smaller linear insertion force, and the fastener is an automotive vehicular fastener.

21. The method of claim 17, further comprising flowing the polymer from a machine head positioned above a machine support surface, at least one of the machine head and the machine support surface automatically moving relative to the other according to computer instructions in order to create identical multiples of the fastener in the same manufacturing cycle.

22. The method of claim 17, further comprising curing the polymers with light as the polymer is built up to create the fastener, and supplying the polymer to the at least one opening via at least one hose.

23. The method of claim 17, further comprising building up the fastener on top of a stationary machine support surface, on a layer by layer basis.

24. The method of claim 17, wherein the fastener is substantially surrounded by a gas while the using steps occur.

25. A method of making a fastener, the method comprising:
(a) using at least one printer opening to emit at least one printable polymer to create a laterally enlarged head having a circular periphery;
(b) using the at least one printer opening to emit the at least one printable polymer to create a longitudinally elongated stem extending from the head;
(c) using the at least one printer opening to emit the at least one printable polymer to create a continuous and flexible spiral around at least a majority of the stem, and creating a die-locked acute angle continuously located between the spiral and the stem for multiple turns of the spiral which have the same outside diameter;
(d) flowing the polymer from the printer openings positioned above a machine support surface, at least one of: the machine support surface and the openings, automatically moving relative to the other according to computer instructions in order to create substantially identical multiples of the fastener in the same manufacturing cycle;
(e) curing the at least one printable polymer with light as the polymer is built up to create the fasteners; and
(f) making at least ten of the fasteners during a printing machine cycle within ninety minutes;
wherein the printed polymeric fastener allows flexure of the spiral to withstand a greater linear workpiece-extraction force as compared to a smaller linear workpiece-insertion force, and the fastener is an automotive vehicular fastener.

26. The method of claim 25, wherein the head is built up before the stem.

27. The method of claim 25, further comprising creating the head directly attached to the stem and the stem having a uniform thickness between multiple turns of the spiral.

28. The method of claim 25, further comprising supplying the polymer as a liquid to the at least one opening via at least one hose.

29. The method of claim 25, further comprising building up the fastener on top of the machine support surface, which is stationary, on a layer by layer basis.

30. The method of claim 25, wherein the fastener is substantially surrounded by a gas while the using steps occur.

31. The method of claim 17, further comprising creating tapered outside and inside surfaces on the spiral such that an acute angle is formed between the inner surface and a facing surface of the stem, and layering the polymer to create an enlarged head having a circular periphery.

* * * * *